(12) United States Patent
Jovanovic

(10) Patent No.: US 8,837,559 B2
(45) Date of Patent: Sep. 16, 2014

(54) REDUCING DISTORTION IN REPEATERS FOR OFDM SIGNALS

(71) Applicant: Andrew Wireless Systems GmbH, Buchdorf (DE)

(72) Inventor: Milun Jovanovic, Buchdorf (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 64 days.

(21) Appl. No.: 13/836,552

(22) Filed: Mar. 15, 2013

(65) Prior Publication Data

US 2014/0050253 A1   Feb. 20, 2014

Related U.S. Application Data

(60) Provisional application No. 61/683,903, filed on Aug. 16, 2012.

(51) Int. Cl.
  *H04L 25/20* (2006.01)
  *H04L 27/26* (2006.01)

(52) U.S. Cl.
  CPC ..................... *H04L 27/26* (2013.01)
  USPC .......................... 375/211; 375/285

(58) Field of Classification Search
  USPC .......... 375/211, 219, 220, 260, 254, 278, 285
  See application file for complete search history.

(56) References Cited

U.S. PATENT DOCUMENTS

| | | | |
|---|---|---|---|
| 5,396,496 A | 3/1995 | Ito et al. | |
| 6,144,853 A * | 11/2000 | Gentles et al. | 455/553.1 |
| 6,853,675 B1 * | 2/2005 | Oleynik | 375/130 |
| 7,359,312 B2 | 4/2008 | Riazi et al. | |
| 7,486,735 B2 | 2/2009 | Dubuc et al. | |
| 7,573,807 B1 | 8/2009 | Riazi et al. | |
| 7,813,315 B2 | 10/2010 | Cleveland et al. | |
| 7,979,027 B2 | 7/2011 | Vanharlingen et al. | |
| 8,228,878 B2 | 7/2012 | Larsson et al. | |
| 2004/0136313 A1 * | 7/2004 | Goldstein et al. | 370/203 |
| 2005/0105657 A1 * | 5/2005 | Kroeger et al. | 375/347 |
| 2006/0097915 A1 * | 5/2006 | Martin et al. | 342/357.15 |
| 2008/0112308 A1 | 5/2008 | Cleveland | |
| 2009/0268830 A1 | 10/2009 | Birru et al. | |
| 2009/0323834 A1 | 12/2009 | Kondo | |
| 2010/0040009 A1 | 2/2010 | Gaal et al. | |
| 2010/0144278 A1 | 6/2010 | Vanharlingen et al. | |

(Continued)

OTHER PUBLICATIONS

Braz et al., "PAPR Reduction Technique Using Unused Subcarriers for SFBC-based MIMO-OFDM Systems," Proceedings of the 3rd European Wireless Technology Conference, Paris, France, Sep. 27-28, 2010, pp. 141-144, IEEE (4 pages).

(Continued)

*Primary Examiner* — Emmanuel Bayard
(74) *Attorney, Agent, or Firm* — Kilpatrick Townsend & Stockton LLP

(57) ABSTRACT

Certain aspects and features are directed to determining characteristics such as phase margin and gain margin of signals such as standardized orthogonal frequency-division multiplexing ("OFDM") signals. In one aspect, a processing system can identify multiple carriers in an OFDM signal communicated by a repeater. The carriers include carriers from frequency guard band other than those used for communicating payload data or pilot data. The processing system can generate dynamic characteristic data to be sent via the carriers. The processing system can generate modulate the carriers with the dynamic characteristic data. The modulated power level of the carriers is less than a maximum level of noise filtered by a device receiving the OFDM signal.

16 Claims, 8 Drawing Sheets

(56) References Cited

U.S. PATENT DOCUMENTS

2011/0116569 A1 5/2011 Vaughan et al.
2011/0312613 A1* 12/2011 Battersby et al. ............... 506/23

OTHER PUBLICATIONS

Braz et al., "Peak-to-Average Power Ratio Reduction of SFBC MIMO-OFDM Signals Using Unused Tones," The IEEE International Microwave Workshop Series on RF Front-ends for Software Defined and Cognitive Radio Solutions (IMWS), Aveiro, Portugal, Feb. 2010, IEEE (4 pages).

Rihawi et al., "PAPR Reduction Scheme with SOCP for MIMO-OFDM Systems," I. J. Communications, Network and System Sciences, 2008, pp. 29-35, vol. 1: 1-103, Scientific Research Publishing (7 pages).

* cited by examiner

US 8,837,559 B2

REDUCING DISTORTION IN REPEATERS FOR OFDM SIGNALS

CROSS-REFERENCE TO RELATED APPLICATIONS

This application claims priority to U.S. Provisional Application Ser. No. 61/683,903 filed Aug. 16, 2012 and titled "Determining Phase and Gain Margin in Repeaters for OFDM Signals," the contents of which are hereby incorporated by reference.

TECHNICAL FIELD

The present invention relates generally to telecommunications systems and more particularly (although not necessarily exclusively) to determining phase and gain margin in repeaters for signals in orthogonal frequency-division multiplexing ("OFDM") telecommunication systems.

BACKGROUND

Repeater devices that re-transmit signals in telecommunications systems may experience signal distortion resulting from a run-around channel and/or a ring-around channel. A run-around channel may include a channel used by a coverage antenna of a repeater that includes one or more frequencies that can be received by the donor antenna. A ring-around channel may include a channel used by a donor antenna of a repeater that includes one or more frequencies that can be received by the coverage antenna. A run-around channel or ring-around channel can cause a signal transmitted by a first antenna of a repeater, such as a coverage antenna, to be recovered by a second antenna of the repeater, such as a repeater antenna. A delayed version of the recovered signal (also referred to as a round-around signal or ring-around signal) can be erroneously retransmitted by the first antenna. For a repeater having a gain that exceeds the isolation of the antennas, erroneously retransmitting the signal can cause the repeater to clip signals (e.g., overshoot or undershoot scenarios) and/or to oscillate.

Previous solutions for addressing distortion resulting from a run-around channel and/or a ring-around channel may involve using adaptive echo cancellation filters. Adaptive echo cancellation filters may be used to produce error signals that mimic a round-around signal or ring-around signal. Such solutions may not be able to reduce distortion caused by round-around signals or ring-around signals having a channel transfer function that changes rapidly. For example, in-train repeaters, motorway repeaters, and other mobile repeaters may experience distortion from round-around signals or ring-around signals having a channel transfer function that changes rapidly. For round-around signal or ring-around signal having a channel transfer function that changes rapidly, an adaptive echo cancellation system may be unable to cancel the round-around signal or ring-around signal on a run time basis, thereby causing the repeater to clip and/or oscillate.

SUMMARY

Certain aspects and features of the present invention are directed to a determining reducing distortion of signals such as orthogonal frequency-division multiplexing ("OFDM") signals communicated by a repeater system.

In one aspect, a method is provided. The method involves identifying carriers in an orthogonal frequency-division multiplexing ("OFDM") signal communicated by a repeater (such as, but not limited to, a standardized OFDM signal detected by the repeater). The identifier carriers include carriers other than carriers used for communicating payload data or pilot data. The method also involves generating dynamic characteristic data (such as, but not limited to, stochastic dynamic data) to be communicated via the carriers. The method also involves modulating the identified carriers with the dynamic characteristic data. A power level of the modulated carriers is less than a maximum level of noise filtered by a device receiving the orthogonal frequency-division multiplexing signal.

DETAILED DESCRIPTION

Figure 1:
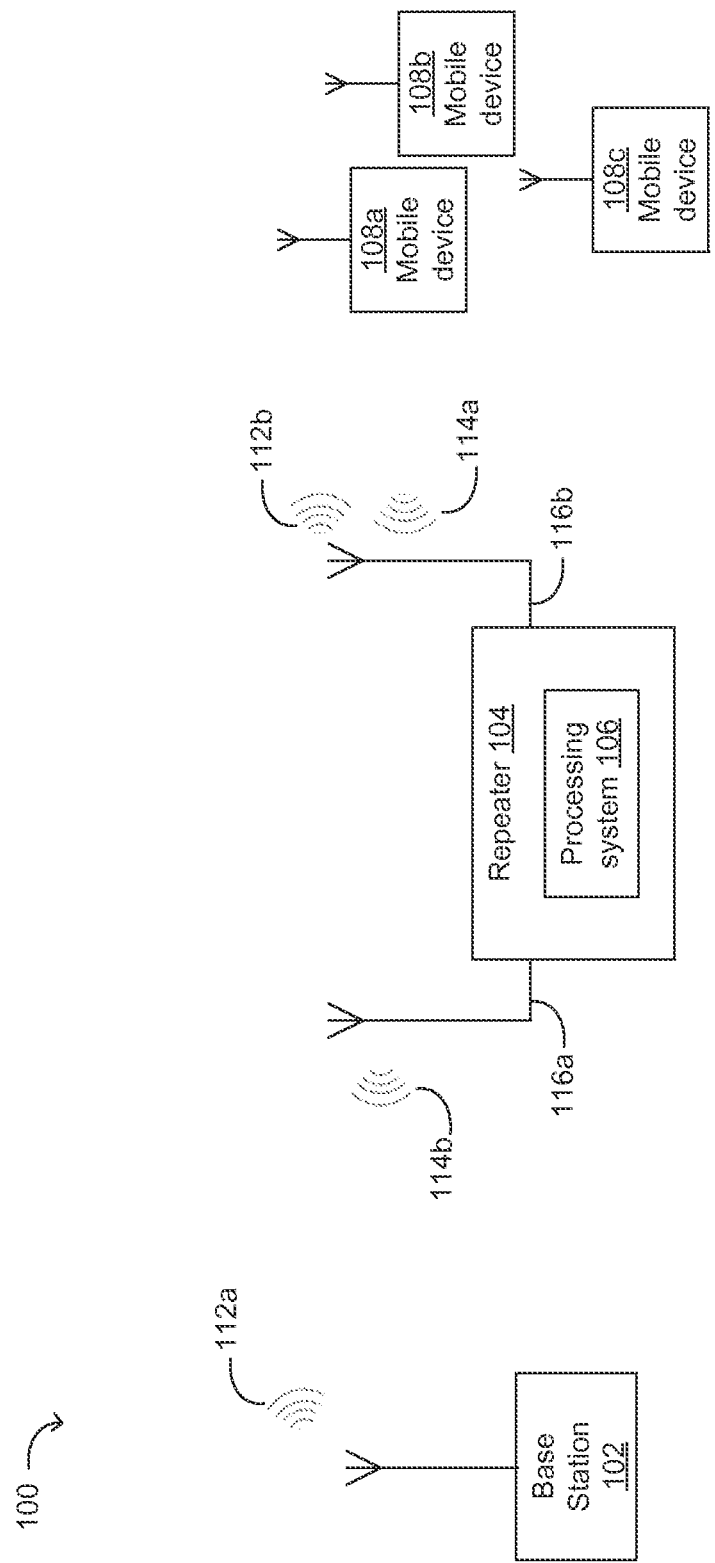
FIG. 1 is a block diagram of a telecommunication system including a base station in communication with a repeater having a processing system for determining phase margin and gain margin according to one aspect.

Certain aspects and features of the present invention are directed to a reducing distortion of signals such as orthogonal frequency-division multiplexing ("OFDM") signals communicated by a repeater system by transmitting dynamic characteristic data via otherwise unused carriers in one or more frequency guards bands of OFDM signals. The unused carriers in one or more frequency guard bands can be identified based on, for example, a telecommunication protocol provided by a standards organization.

In some aspects, a repeater can detect that a signal is a standardized OFDM signal. The repeater can identify the presence of OFDM signals in a communication channel. The repeater can identify characteristics of the OFDM signal such as (but not limited to) timing guard length (e.g., cyclic prefix), FFT mode, OFDM symbol duration, etc. The repeater can also identify frequency guard bands of the OFDM signal. Frequency guard bands can include unused carriers. The unused carriers of frequency guard bands can be used to reduce adjacent channel leakage power and/or estimate a noise level for a channel via which an OFDM signal is communicated. Frequency guard bands can be specified in OFDM standards or other telecommunications protocols. In a specter, the unused carriers may be located in a bandwidth between a bandwidth of the OFDM signal and a bandwidth of the OFDM channel. The repeater can insert low-energy OFDM carriers in place of the unused carriers and/or otherwise modulate the unused subcarriers in one or more of the frequency guard bands. Dynamic characteristic data, such as (but not limited to) stochastic dynamic data, can be generated for communication via the low-energy OFDM carriers. The dynamic characteristic data may include data other than predefined data and/or unique identification data. The stochastic dynamic data or other suitable dynamic characteristic data can be transmitted with the OFDM signal via the inserted low-energy carriers in one or frequency guard bands. The inserted low-energy carriers can be modulated with the dynamic characteristic data. The power level of the inserted carriers can be less than a maximum level of noise filtered by the repeater and/or other device receiving the OFDM signal, such as a mobile device receiving a downlink signal from a coverage antenna of the repeater. The repeater can re-transmit the standardized OFDM signal with the added dynamic characteristic data without creating interference to other devices receiving the re-transmitted OFDM signal.

A low amount of energy can be used to modulate unused carriers (such as, but not limited to unused pilot carriers) in one or more frequency guard bands. Using a power level of the inserted carriers that is less than a maximum level of noise filtered by devices receiving the OFDM signal can reduce or avoid generating interference and/or spurious emissions. For example, interference and/or spurious emissions can be caused by using a similar or comparable amount of energy in frequency guard band carriers as used for pilot or payload carriers in an OFDM signal.

Modulating the unused carriers in one or more frequency guard bands with dynamic characteristic data can allow for determining a channel transfer function between a coverage antenna and a donor antenna of a repeater. The determined channel transfer function can provide information about a gain margin and/or a phase margin of the repeater. For example, a repeater can transmit an OFDM signal having stochastic dynamic data or other suitable dynamic characteristic data via a first antenna (e.g., a coverage antenna) and receive via the OFDM signal via a second antenna (e.g., a donor antenna). The repeater can determine a channel transfer function between the first antenna and the second antenna using the dynamic characteristic data. The repeater can determine a phase margin and a gain margin between the first antenna and the second antenna using the channel transfer function. The repeater can modify the phase margin and gain margin to maintain the stability of the repeater.

The dynamic characteristic data can include identification information other than predetermined identification information value. Non-limiting examples of dynamic characteristic data can include a dynamic internet protocol ("IP") address obtained from a packet data network, dynamic performance and statistics data that change over time, and the like.

As used herein, the term "unused carrier" can include one or more carriers from a frequency guard band specified as being unused by a standardization community or other organization. Using carriers identified by a standardization community or other organization as otherwise being unused or inactive can allow repeaters and other telecommunication devices using standardized formats to also communicate dynamic characteristic data. One non-limiting example of an unused carrier is a carrier to which no transmission power is allocated. Another non-limiting example of an unused carrier is a carrier that is not modulated for communicating payload data. Another non-limiting example of an unused carrier is a carrier other than the carriers used for communicating payload data or pilot data of the OFDM signal. In some aspects, unused carriers selected for transmitting stochastic dynamic data or other suitable dynamic characteristic data may not include unused carriers identified for communicating payload data by a standardization community or other organization.

Transmitting stochastic dynamic data or other dynamic characteristic data using frequency guard bands can avoid modulating inactive carriers from a signal bandwidth with predefined transmitter identifier information, inactive carriers from a signal bandwidth carrying identification data at a reduced power, and/or inactive carriers carrying identifying signal with each OFDM symbol.

In some aspects, the OFDM signals can have a scalable number of OFDM fast Fourier transform ("FFT") carriers. In other aspects, the OFDM signals can have a fixed number of OFDM FFT carriers. A repeater can detect the OFDM signals with a scalable number of OFDM FFT carriers and/or signals with a fixed number of OFDM FFT carriers.

In additional or alternative aspects, dynamic characteristic data may not be transmitted with each OFDM symbol. For example, dynamic characteristic data can be transmitted periodically, such as with every second symbol, or in a burst with multiple symbols.

In additional or alternative aspects, devices or groups of devices in a telecommunication system, such as (but not limited to) a repeater system can be configured for determining characteristics such as (but not limited to) phase margin and gain margin of OFDM signals. In some aspects, a repeater or other telecommunication device can provide echo determination and/or cancellation using OFDM FFT carrier bins from one or more frequency guard bands. The OFDM frequency guard band can be used for specter shaping and noise evaluation An OFDM frequency guard band can include unused carriers for an OFDM signal as predefined by a standardization community or other organization. Unused carriers from one or more frequency guard bands can be inserted and/or modulated using low energy. A low energy can include a signal level that does not overwhelm a required signal-to-noise and/or a C/R ratio in a communication channel. The added low energy can be filtered from the signal in the repeater. Adding low energy in one or more frequency guard bands having a signal level that is less than that of noise energy in the same guard band can reduce or avoid creating interference to adjacent channels and can avoid increasing a "shoulder" in a given frequency guard band. In other aspects, a repeater or other telecommunication device can provide echo determination and/or cancellation using a complex pilot that is filling unused resource bins of an OFDM modulated signal. The echo determination and/or cancellation may operate on the echo of the pilot.

In some aspects, a repeater or other device may calculate or otherwise determine a channel transfer function of a run-around channel or a ring-around channel. Calculating or otherwise determining the run-around channel transfer function for a signal having dynamic stochastic data or other suitable dynamic characteristic data identifying or characteristic of a specific repeater can allow for calculating or otherwise determining the phase and gain margin of a closed loop repeater. The calculated phase and gain margin can be used to maintain the stability of a run-around channel or ring-around channel of a repeater.

Calculating or otherwise determining a run-around or ring-around channel transfer function on a run time basis can be used by a repeater, such as an RF repeater, for controlling the channel filter coefficients or filter type, repeater gain, and/or calculation adaptive echo canceller coefficient. Doing so can maintain a phase margin and gain margin that will prevent or reduce clipping and oscillation.

In some aspects, the method described above can be applied by a repeater communicating OFDM signals. Non-limiting examples of telecommunications standards that can use OFDM signals can include Long Term Evolution ("LTE"), Worldwide Interoperability for Microwave Access ("WiMAX"), Digital Video Broadcasting-Terrestrial ("DVB-T"), Digital Video Broadcasting-Handheld ("DVB-H"), etc. An OFDM signal can include a first group of carriers in a frequency domain from OFDM signal bandwidth as payload carriers. The OFDM signal can also include a second number of carriers in a frequency domain from OFDM signal bandwidth as pilot carriers or other unused carrier. Standardization communities and other organization may define carriers from one or more frequency guard bands as unused carriers. Unused carriers of an OFDM signal can include carriers on which no payload data is communicated. For example, unused carriers from one or more frequency guard bands can be used to estimate or otherwise determine a noise level of an OFDM signal in an OFDM channel.

The modulation type and code rate of transmitted OFDM signals can be dependent on the current carrier/noise ("C/N") ratio in the OFDM channel. The C/N ratio is a parameter used by devices in telecommunications systems, such as mobile devices and base stations, for selecting the modulation type and code rate that will be deployed in telecommunication channel. The level of noise from OFDM signal bandwidth can be estimated using a level of noise from the one or more frequency guard bands used for communicating dynamic characteristic data. Modulations used for OFDM telecommunications can include quadrature amplitude modulation and phase-shift keying modulation.

A repeater may be configured with a channel filter function. A channel filter function allows a repeater to reduce the level of noise in a channel that appears in repeater coverage area, such as a channel in an OFDM channel bandwidth. After filtering, the level of noise in a channel that appears in repeater coverage area may be less than level of noise in channel from donor antenna.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 is a block diagram depicting a telecommunication system 100 including a base station 102 in communication with mobile devices 108a-c via a repeater 104. The repeater 104 may be a digital RF repeater. The repeater 104 can capture RF data at one or more points in a signal path between the base station 102 and one or more of the mobile devices 108a-c. The repeater 104 can include a processing system 106 and antennas 116a, 116b.

The repeater 104 can communicate with other devices via the antennas 116a, 116b. The repeater 104 can receive signals from the base station 102 via the antenna 116a and re-transmit the signals to the mobile devices 108a-c via the antenna 116b. The repeater 104 can also receive signals from the mobile devices 108a-c via the antenna 116b and re-transmit the signals to the base station 102 via the antenna 116a. Although FIG. 1 depicts the repeater 104 as having two antennas, the repeater 104 can include any number of antennas or other suitable devices, such as radiating cables, for communicating signals with a base station 102 and mobile devices 108a-c.

The repeater 104 can radiate signals from the base station 102 to one or more physical areas in the telecommunication system 100 in which mobile devices 108a-c or other communication devices may be present. The repeater 104 can communicate signals with the base station 102 via a wireless communication medium. The repeater 104 can communicate with one or more mobile devices 108a-c in a coverage area serviced by the repeater 104.

The base station 102 can transmit a downlink signal 112a to a one or more of the mobile devices 108a-c via the repeater 104. The repeater 104 can receive the downlink signal 112a via the antenna 116a. The repeater 104 can re-transmit the downlink signal 112a as a downlink signal 112b via the antenna 116b.

The repeater 104 can receive an uplink signal 114a from one or more of the mobile devices 108a-c via the antenna 116b. The repeater 104 can re-transmit the uplink signal 114 as an uplink signal 114b to the base station 102 via the antenna 116a.

The processing system 106 can perform one or more signal processing operations for reducing or eliminating distortion caused by round-around signals or ring-around signals having a channel transfer function that changes rapidly.

Figure 2:
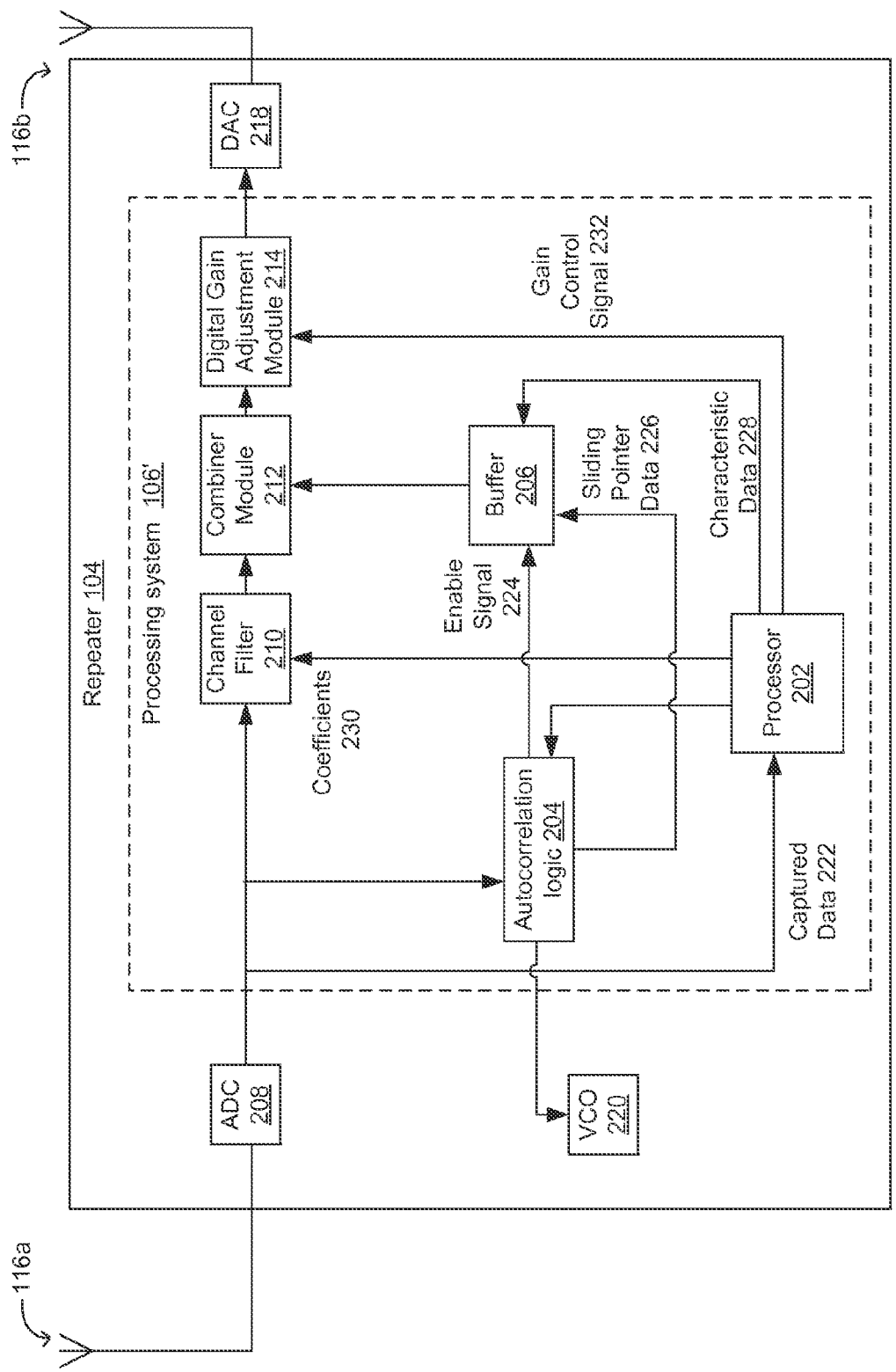
FIG. 2 is a block diagram of a repeater having an example processing system for determining phase margin and gain margin according to aspect.

FIG. 2 is a block diagram depicting an example implementation of a processing system 106 for monitoring phase and gain margin on a digital RF repeater according to one aspect. The processing system 106 depicted in FIG. 2 includes a processor 202, autocorrelation logic 204, a buffer 206, a channel filter 210, a combiner module 212, and a digital gain adjustment module 214.

The processor 202 can analyze captured data 222 from an analog-to-digital converter 208. The processor 202 can recognize in the captured data 222 the presence of an OFDM signal with dynamic stochastic data, proprietary, data or other identification information. The processor 202 can determine an applied OFDM standard. The processor 202 can internally generate a signal that will be copied into the buffer 206.

In some aspects, the processing section can synchronize a clock of the repeater 104 with a clock of the base station 102. Clock synchronization and other telecommunication standardization may be performed by feeding some or all of the hardware components of the repeater 104 from a voltage-controlled oscillator ("VCO") 220.

Figure 3:
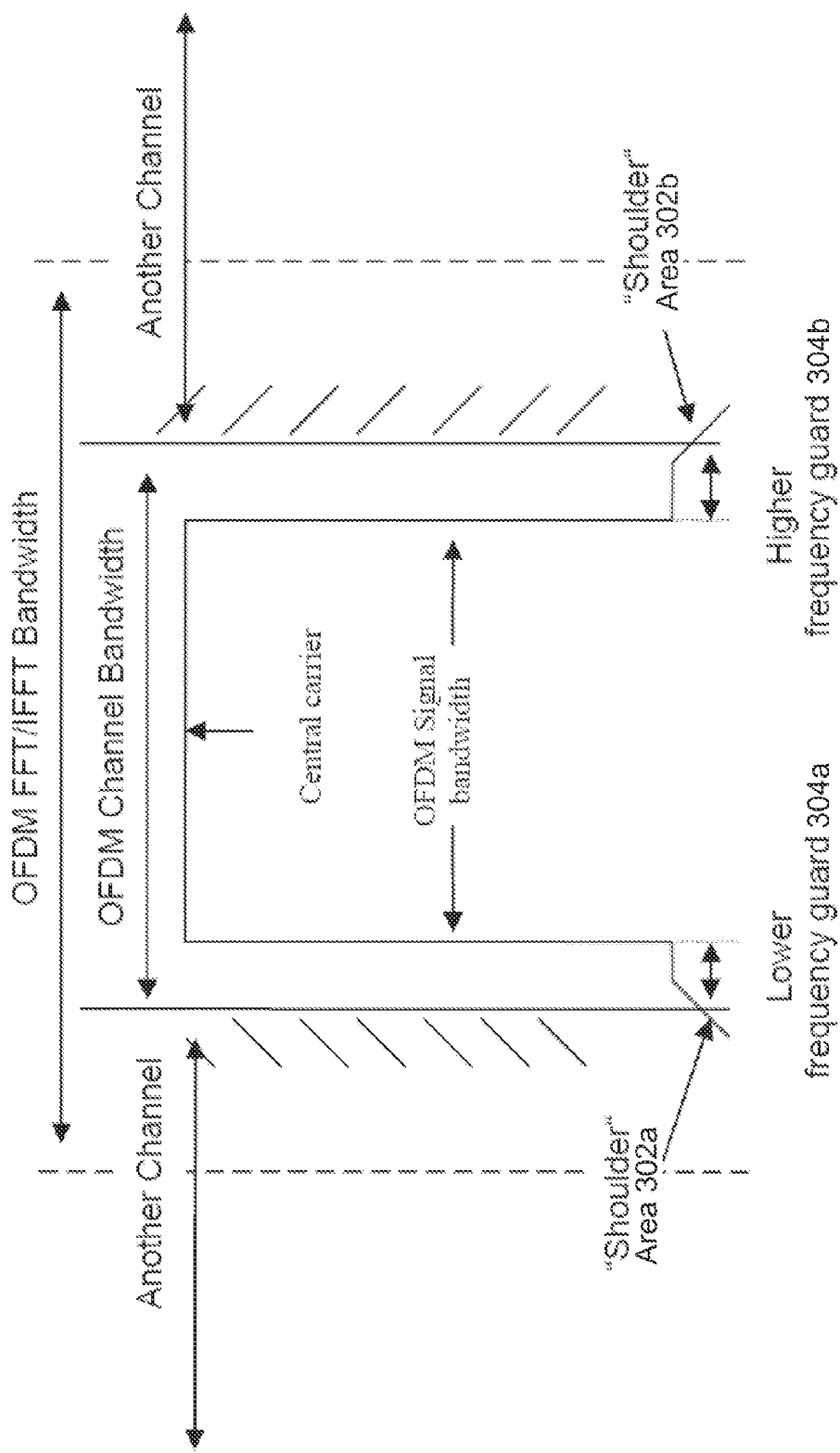
FIG. 3 is a diagram depicting a spectrum of a standardized orthogonal frequency-division multiplexing ("OFDM") signal that can be used for transmitting dynamic characteristic data according to one aspect.

FIG. 3 is a diagram depicting a spectrum used by an example OFDM channel. An example OFDM channel can include "shoulder" areas 302a, 302b in between the OFDM channel and adjacent OFDM channel. A "shoulder" area can include an area in which signal strength rapidly decreases. The example OFDM channel can include guard bands 304a, 304b between the OFDM channel bandwidth and OFDM signal bandwidth.

Figure 4:
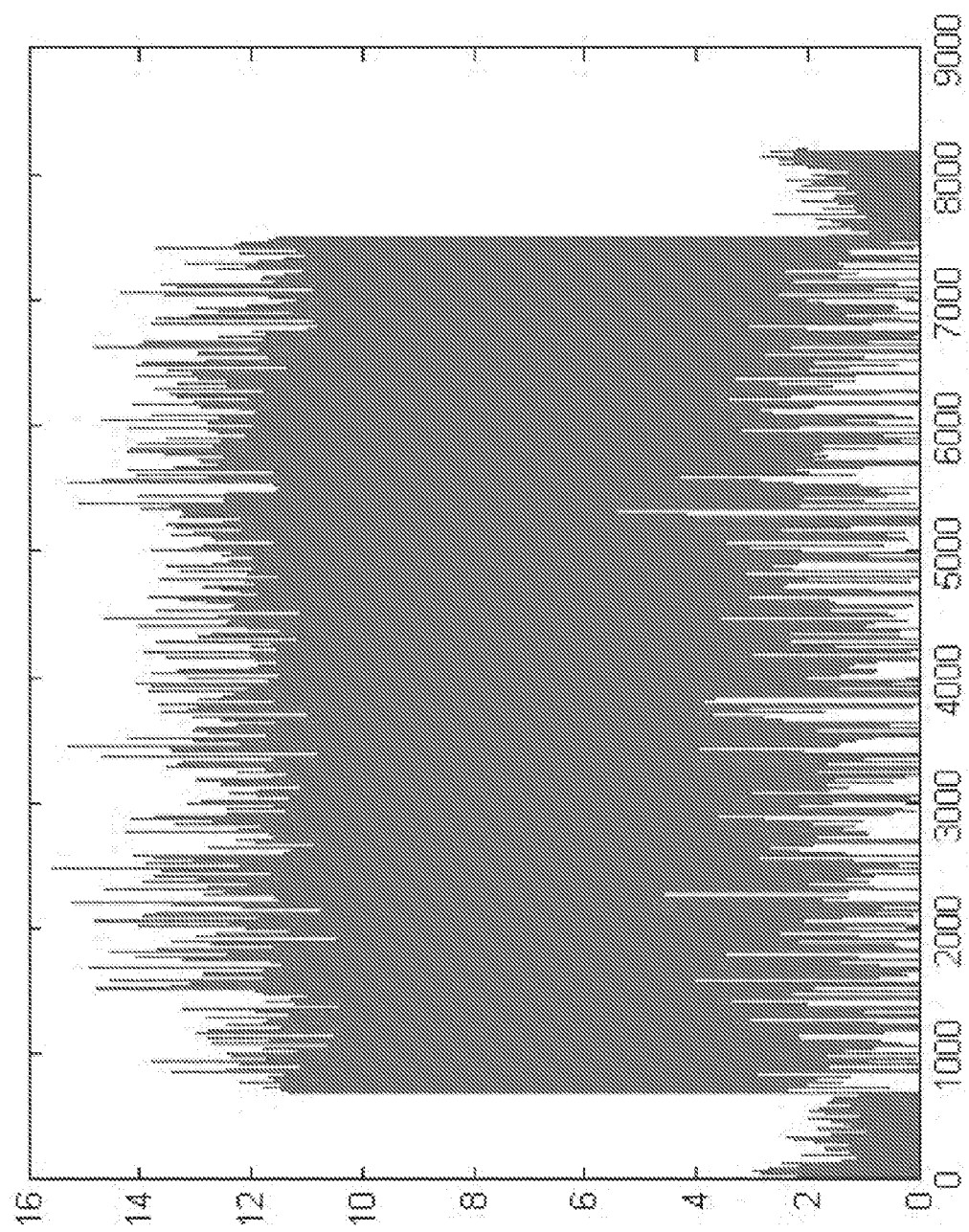
FIG. 4 is a chart depicting a signal at an input of a channel filter of a processing system of a repeater according to one aspect.
Figure 5:
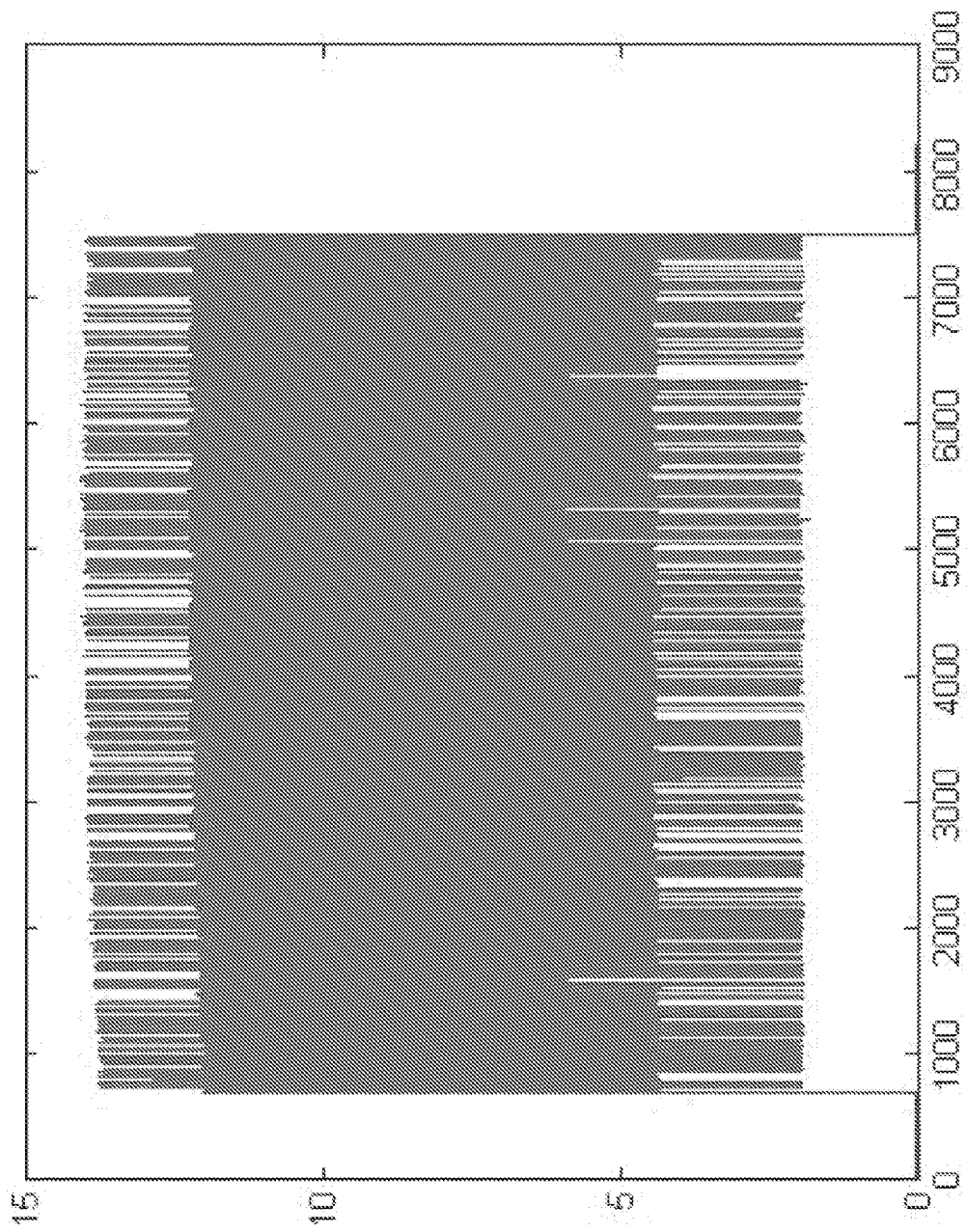
FIG. 5 is a chart depicting a signal at an output of a channel filter of a processing system of a repeater according to one aspect.

The channel filter 210 can filter noise from the channel bandwidth, as described in detail below with respect to FIGS. 4-5. The processor 202 of the repeater 104 can calculate or otherwise determine a C/N ratio at a point in a signal path before a channel filter 210 and at a point in a signal path after the channel filter 210. FIG. 4 is a chart depicting a signal at an input of a channel filter 210. Filtering noise can include removing noise from unused subcarriers in one or more of the frequency guard bands 404a, 404b.

Noise can be removed by the channel filter 210 from an OFDM signal. FIG. 5 depicts the digital signal at an output of a channel filter 210. The signal can also represent an output signal radiated by a coverage antenna 116b. Each frequency guard band at the output of the channel filter 210 may have little or no energy. The noise can be mostly or completely removed from the signal by the channel filter 210. Adding a low power in the frequency guard band of an OFDM signal can improve a determination of a channel transfer function between a coverage antenna 116b and a donor antenna 116a.

Adding the power in the frequency guard band that is less than the power of noise in the same band before the channel filter 210 or detected deployed coding rate can reduce or prevent disturbances at the base station(s) 102 and/or mobile devices 108a-c or other terminal equipment. The base station(s) 102 and/or mobile devices 108a-c or other terminal equipment can also include channel filters. Energy from frequency guard band can be removed before the base station(s) 102 and/or the mobile devices 108a-c or other terminal equipment performs signal demodulation of received signals. The carriers from the OFDM signal bandwidth carry information in channel. The calculated channel transfer function provides information about the phase and gain margin. The phase and gain margin provides information about stability of the repeater 104.

In some aspects, the processor 202 can provide filter coefficients 230 to the channel filter 210. The processor 202 can reduce or increase a digital gain value via a gain control signal 232 communicated to the digital gain adjustment module 214. The processor 202 can reduce or increase the digital gain value according to the calculated gain and phase margins to prevent oscillation.

The processing system 106 of the repeater 104 can remove run-around signal or a ring-around signal from the input signal using channel filter 210. The processing system 106 can reduce the gain to protect analog components (e.g., analog-to-digital converters, power amplifiers, etc.) from saturation. The processor 202 can generate an OFDM symbol that includes carriers from one or more frequency guard bands. The carriers from the OFDM signal bandwidth may not be present in OFDM symbol. The carriers from the one or more frequency guard bands can be modulated with dynamic characteristic data 228. The locally generated OFDM signal data can be added in the buffer 206, as described in detail below with respect to FIG. 6.

In some aspects, the processing system 106 of the repeater 104 can use a forward FFT transform to generate stochastic dynamic data or other dynamic characteristic data 228. For example, an OFDM symbol that can be supplemented with symbols sent from the base station 102 can be generated using a forward FFT function. The processing system 106 can conjugate frequency domain samples. The processing system 106 performs an FFT. The processing system 106 can conjugate results of the forward FFT. The processing system 106 can divide forward FFT data (e.g., time domain data) with N that presents detected FFT size of received OFDM symbols:

$$\text{Noise\_Like\_Data} = (1/N) \times \text{conj}(\text{FFT}(\text{conj}(X)))$$

where X presents array size N of noise-like data in FFT domain. Using a forward FFT transform to generate dynamic characteristic data can avoid using differentially encoded symbols stored in an inverse FFT ("IFFT") buffer.

The channel filter coefficients 230 and digital gain communicated via the gain control signal 232 can be selected by the processor 202 to provide a maximum output power of a "clean" signal sent from the base station. The digital-to-analog converter 218 can convert the digital signal to an analog signal for transmission by the coverage antenna 116b.

Dynamic characteristic data 228 (such as, but not limited to dynamic stochastic data, proprietary data, or other identification information) can be inserted on unused carriers, such as carriers in one or more frequency guard bands. The dynamic characteristic data 228 can be used to calculate or otherwise determine channel transfer function of a run-around channel or round-around channel. Terminal equipment, such as (but not limited to) mobile devices 108a-c in communication with the repeater 104 and base station(s) 102 can treat the frequency guard band carriers with dynamic stochastic data or other suitable dynamic characteristic data as noise or "out-of-band data". Terminal equipment and base stations can ignore frequency guard band carriers, which may not carry any payload information.

Figure 6:
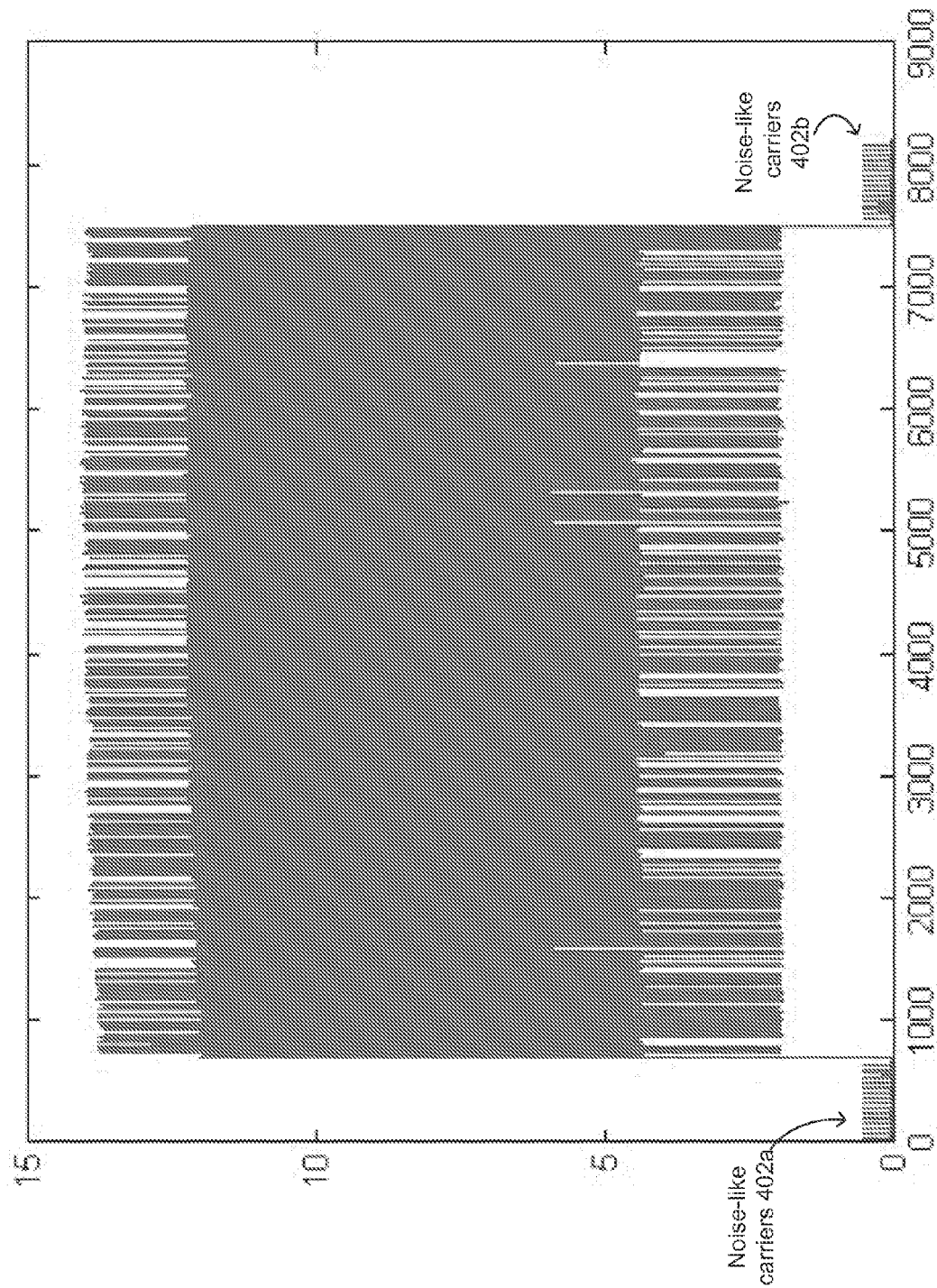
FIG. 6 is a chart depicting a signal processed by a repeater to include noise-like carriers for carrying dynamic characteristic data according to one aspect.

FIG. 6 depicts an OFDM signal that includes "noise-like" carriers 402a, 402b added to the signal. The carriers 402a, 402b can be in one or more frequency guard bands adjacent to frequency bands used for communicating payload data. The carriers 402a, 402b can be used for transmitting dynamic stochastic data or other suitable dynamic characteristic data. The carriers 402a, 402b can include carriers in a telecommunication channel that may be positioned at frequencies: $F_{max}$+k×carrier_spacing and $F_{min}$−k×carrier_spacing. $F_{max}$ and $F_{min}$ are first and last fast Fourier transform ("FFT") bins from an OFDM channel. The carriers 402a, 402b can be positioned at frequency points in the frequency domain such that orthogonality to other FFT bins/carriers from an OFDM channel is not affected. Positions of $F_{max}$ and $F_{min}$ carriers/bins may be defined by standardization communities or other organizations for standardized OFDM signals.

For different OFDM standards with different FFT length and/or different frequency guard bands, a different number of extra carriers can be defined. The number of extra carriers can be defined based on the number of the carriers, the evaluated C/N ratio and evaluated shoulder attenuation at the repeater donor antenna, and the carrier power for the carriers. Added "noise-like" carriers should not decrease a C/N ratio of a signal below a required minimum according to a modulation type for a given OFDM standard. The power of added "noise-like carriers" can be selected such that the "shoulder" attenuation at terminal equipment and base stations is not reduced or otherwise negatively impacted.

The carriers 402a, 402b via which dynamic stochastic data or other suitable dynamic characteristic data is communicated can have a power level lower than a calculated noise level on a pre-filter point. Terminal equipment can thus filter the dynamic stochastic data or other suitable dynamic characteristic data from one or more frequency guard bands of a signal received by a repeater. Non-limiting examples of terminal equipment can include a base station 102 receiving an uplink signal from a donor antenna 116a or one or more of the mobile devices 108a-c receiving a downlink signal from a coverage antenna 116b. The level of added dynamic stochastic data or other suitable dynamic characteristic data can allow quasi error-free communication between a base station 102 and terminal equipment such as the mobile devices 108a-c.

A high bit data rate in a channel can be achieved by using 64 quadrature amplitude modulation ("QAM") and a code rate of 7/8 for an OFDM signal using standards such as LTE, WiMAX, DVB-T/H, etc.

Adding dynamic stochastic data or other suitable dynamic characteristic data to a signal in such a manner that the C/N ratio of the signal is below 35 dB can allow a channel to operate in a quasi-error-free mode.

For example, DVB channels can be used in 8 k and 2 k mode. 32 carriers in a DVB-T or DVB-H channel can be used to communicate priority or other identification information. The carrier power of the carriers used to communicate priority or other identification information can be 1/64 the power of payload carrier. The calculated C/N ratio in the channel for a signal transmitted by repeater can be:

$$(C/N)_{xk} = 10 \times \log((\text{payload} + \text{scattered} + \text{continual}) \times (4/3)^2 + \text{TPS} \times 1)/(32 \times 1/64))$$

$$(C/N)_{8k} = 10 \times \log((6048 + (524 + 177) \times 16/9 + 68 \times 1)/(1/2)) = 41.68 \text{ dB}$$

$$(C/N)_{2k} = 10 \times \log((1512 + (131 + 45) \times 16/9 + 17 \times 1)/(1/2)) = 35.66 \text{ dB}$$

The C/N ratio in the channel can be above the minimum C/N required for the 64 QAM modulation type and 7/8 coding rate. (Additional details can be found in Fischer, DIGITAL VIDEO AND AUDIO BROADCASTING TECHNOLOGY, A PRACTICAL ENGINEERING GUIDE, SECOND EDITION 368-39 (2008).)

In one example, for 16 QAM modulation using 32 carriers to communicate dynamic stochastic data or other suitable dynamic characteristic data, 128 bits (4×32) can be transmitted. Seven bits can be used with ASCII to send 18 characters. 18 characters can be used for communicating dynamic stochastic data or other suitable dynamic characteristic data such as (but not limited to) specific words or phrases. For example, the specific words or phrases can include a current dynamic GPRS/CDMA packet data IP address for a repeater as obtained from the network, a received signal strength from a base station in given channels in the a given period of time, a received signal level measured by modem connected to a repeater, an OFDM symbol timestamp, and the like.

In additional or alternative aspects, other modulation systems, such as quadrature phase-shift keying modulation or other suitable modulation systems, can be used to modulate the carriers from one or more frequency guard bands with dynamic stochastic data or other suitable dynamic characteristic data.

The dynamic stochastic data or other suitable dynamic characteristic data can be added to an OFDM signal in one or more frequency guard bands without disturbing communication of payload and/or pilot data between a base station and terminal equipment. A digital RF repeater can calculate or otherwise determine a run-around or ring-around channel transfer function using the dynamic stochastic data or other suitable dynamic characteristic data. The digital repeater can calculate or otherwise determine the phase margin and gain margin of a closed loop using the run-around or ring-around channel transfer function.

In some aspects, a digital RF repeater 104 can calculate and monitor the phase and gain margin on real time basis. A digital RF repeater 104 can keep a closed loop stable by calculating or otherwise determining a channel transfer function between the coverage antenna 116b and the donor antenna 116a. The processor 202 of the repeater 104 can determine the channel transfer function.

In other aspects, communicating an identifier for each repeater in a telecommunication system 100 can allow a specific repeater to determine whether other neighboring repeaters in the telecommunication system are interfering with signals received by the specific repeater. For example, the repeater 104 can calculate or otherwise determine a channel transfer function between the donor antenna 116a and the coverage antennas of neighboring repeaters. A repeater can transmit a current dynamic packet data IP address obtained from the network in the OFDM frequency guard band. IP addresses of neighboring repeaters can be determined based on which signal appears at the donor antenna. IP addresses of neighboring repeaters causing a threshold level of interference can be transmitted to an Operations and Maintenance Center ("OMC") for operating and maintaining the network.

The OMC can identify a unique ID for an interfering repeater from a database of repeaters connected to the packet data network.

Evaluation and calculation of channel transfer function may not require sending dynamic stochastic data or other suitable dynamic characteristic data in every OFDM symbol. In some aspects, the dynamic stochastic data or other suitable dynamic characteristic data periodically transmitted, such as (but not limited to) on every even, fifth or other combination of symbols. Periodically transmitting dynamic stochastic data or other suitable dynamic characteristic data can allow to a repeater to distinguish symbols. The repeater can compare a "shoulder" attenuation characteristic and a level of noise in a channel between symbols with added "noise-like carriers" and symbols without added "noise-like carriers".

In other aspects, communicating an OFDM symbol timestamp can allow a digital RF repeater 104 to calculate or otherwise determine the group delay transmission characteristic of a run-around channel or a ring-around channel. Different OFDM standards may categorize OFDM symbols based on the lengths of different frames. Analyzing an OFDM symbol timestamp can be used to calculate or otherwise determine a group delay transmission characteristic of a run-around channel or a ring-around channel between a donor antenna 116a of a repeater 104 and coverage antenna of neighboring repeaters.

Calculating or otherwise determining a run-around or ring-around channel transfer function can include synchronizing a clock of the repeater 104 with a clock of the base station 102. The repeater 104 can calculate or otherwise determine a frequency error between a synthesizer of the base station 102 and a synthesizer of the repeater 104 in the time domain. The repeater 104 can calculate or otherwise determine a timing error between a digital-to-analog converter of the base station 102 and repeater's analog-to-digital converter 208 in a spectrum (e.g., FFT) domain. Telecommunication standardization may require feeding all hardware components a single VCO 220. Reduction of frequency error between a synthesizer of the base station 102 and a synthesizer of the repeater 104 can reduce timing errors between the digital-to-analog converter of the base station 102 and the analog-to-digital converter 208 of the repeater 104.

Keeping a frequency error less than (carrier_spacing_error/2) can allow the OFDM orthogonality for adding a new signal to be achieved.

Figure 7:
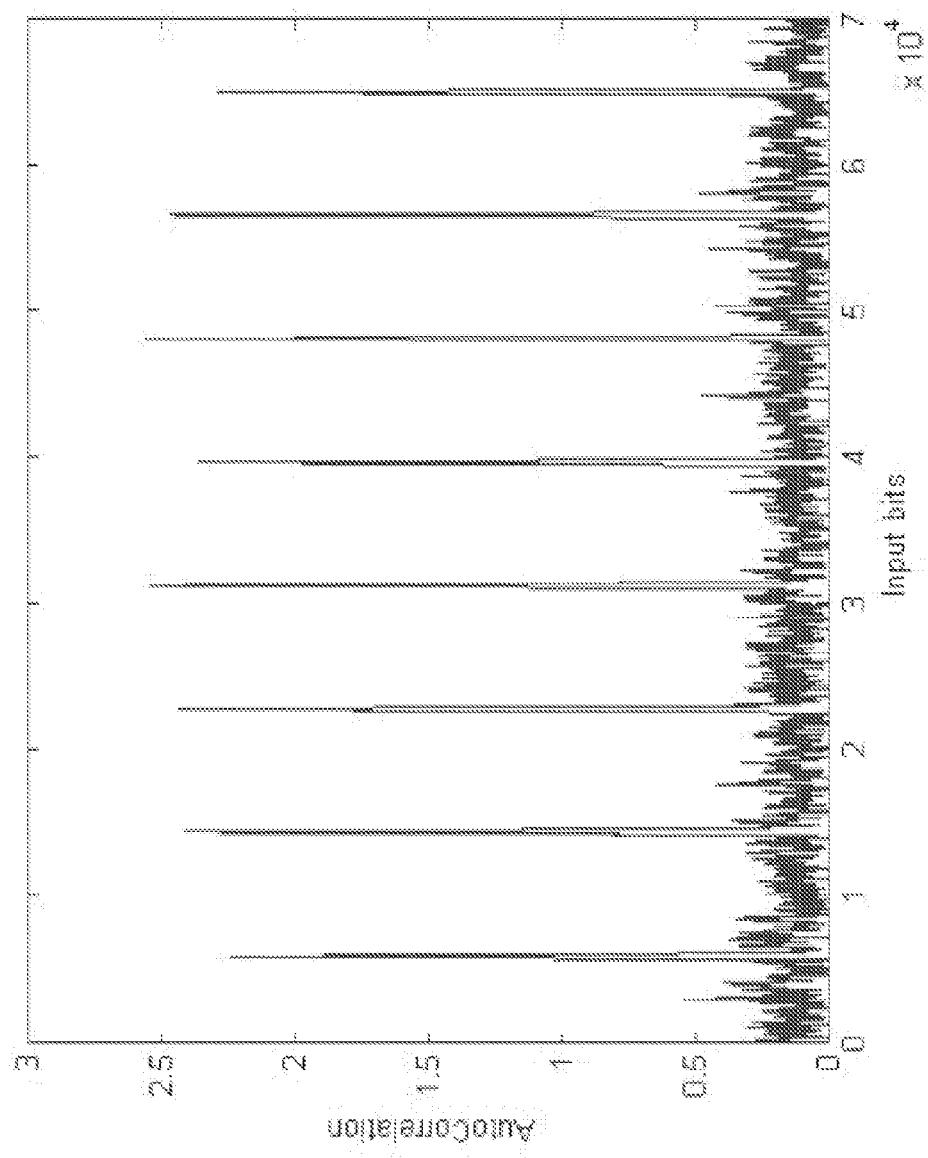
FIG. 7 is a chart depicting operation of autocorrelation logic of a processing system of a repeater according to one aspect.
Figure 8:
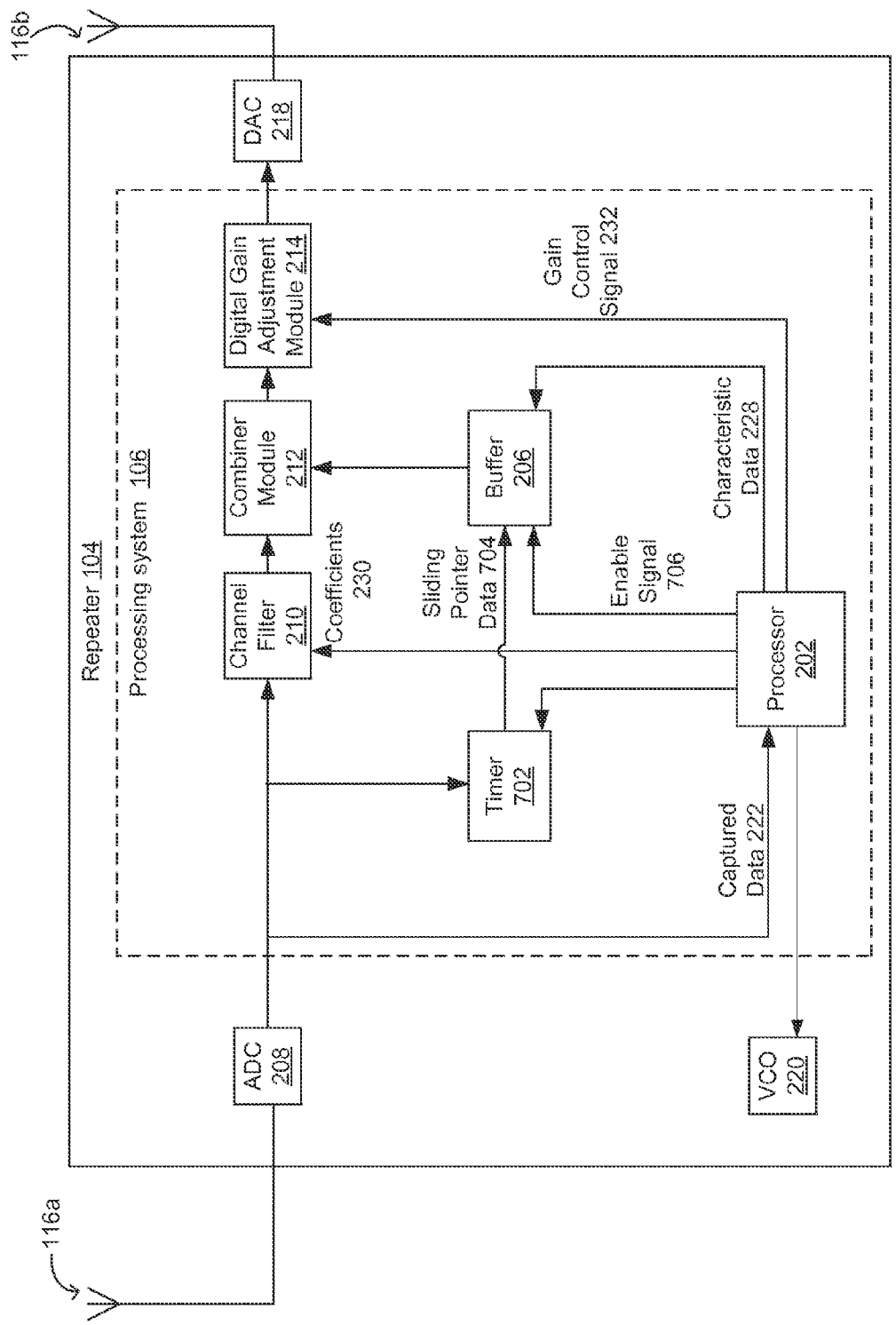
FIG. 8 is a block diagram of a repeater having an alternative example processing system for determining phase margin and gain margin according to aspect.

The autocorrelation logic 204 can calculate or otherwise determine autocorrelation on a data link using a preconfigured OFDM symbol and guard length. FIG. 7 is a chart depicting operation of the autocorrelation logic 204 of the processing system 106. The processor 202 can initialize the autocorrelation logic 204 with a recognized symbol and guard length. The angle of the autocorrelation peak can be used for fine-tuning of the VCO. The autocorrelation logic 204 can keep track of OFDM bits on the line position of sliding pointer data 226. The autocorrelation logic 204 can also enable operation of the buffer 206 via an enable signal 224.

A data bit that is outputted from the channel filter 210 can be modified by the combiner module 212 adding or otherwise combining one data bit from the buffer 206 and a "carry bit" from previous binary addition. The OFDM symbols can start on positions of autocorrelation peaks. A repeater frequency matching a frequency of a base station 102 can cause the distance between autocorrelation peaks to be equal to the OFDM symbol duration.

In some aspects, the autocorrelation logic 204 can disable the output of the buffer 206 based on the repeater 104 losing synchronization with the base station 102.

FIG. 7 depicts an alternative example implementation of a processing system 106' according to one aspect. The processing system 106' can include a timer 702. As depicted in FIG. 7, the processor 202 can control the VCO 220 and the timer 702. The processor 202 can also enable operation of the buffer 206 via an enable signal 706.

The timer 702 can keep track of bits on the data line. The timer 702 can provide sliding pointer data 704 to the buffer 206.

The processor 202 can set the timer 702 to target data bit number after additional data from the line outputted from the channel filter 210 and data from the buffer 206 is received. The processor 202 can periodically capture data 222 from the line. Analyzing the data 22 can allow fine-tuning of the VCO 220 and the timer 702.

The transfer function of a run-around channel or a ring-around channel can be calculated or otherwise determined by the processor 202. The processor 202 can detect previously sent OFDM symbols based on a run-around channel or a ring-around channel being present. New carriers 402a, 402b may be added in one or more OFDM frequency guard bands. A channel transfer function in complete frequency band occupied by an OFDM symbol (OFDM channel bandwidth) can be calculated or otherwise determined using interpolation. Amplitude and phase changes appearing on "Noise-like data" can provide an option for correct calculation of the phase and gain margin. The processor 202 can use the calculated channel transfer function to calculate or otherwise determine channel filter coefficients 230 that can be used to remove unwanted signals inserted via a run-around channel or a ring-around channel.

In additional or alternative aspects, a time-division duplex ("TDD") repeater, distributed antenna system, or other telecommunication system can be synchronized using a Global Positioning System ("GPS") clock. For example, a repeater can synchronize an internal clock with an atomic clock located in geostationary satellites using a GPS receiver. A TDD repeater, distributed antenna system, or other telecommunication device can use the same frequency or channel for both uplink and downlink communications. A base station 102 can perform synchronization using a GPS clock. Each GPS satellite includes an atomic clock that keeps time (or "ticks") with an accuracy of one nanosecond (one billionth of a second). The GPS atomic clock can be used as a reference timing clock for the clock of a repeater and/or the clocks of components of a distributed antenna system. Using an atomic clock of a GPS satellite as a reference clock for repeaters and/or components of a distributed antenna system can optimize or otherwise improve TDD switching reliability.

TDD repeaters and/or components of a distributed antenna system can synchronize switching functions to base stations by analyzing a signal received from a base station and using a GPS clock as a reference timing clock. For repeaters without a GPS interface, a switching function can be performed by analyzing a signal received from a base station and by monitoring timing using a local clock. If a repeater without a GPS interface has insufficient isolation between a coverage antenna and a donor antenna, the repeater may erroneously use the downlink signal transmitted by the coverage antenna for synchronization rather than a signal from the base station. The repeater without a GPS interface can thereby lose switching synchronization with the monitored base station and create strong interference in the base station coverage area and to the base station itself.

The repeater can add proprietary dynamic stochastic data or other dynamic characteristic data to downlink signals transmitted by the coverage antenna to distinguish signals received from the base station from signals received from the donor antenna of the repeater. Successfully distinguishing these two signals repeaters can maintain high reliable TDD switching functionality regardless of interference signals.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. A method for standardized orthogonal frequency-division multiplexing signals with standardized frequency guard length, the method comprising:
   identifying a plurality of carriers in an orthogonal frequency-division multiplexing signal communicated by a repeater, the plurality of carriers comprising carriers other than carriers used for communicating payload data or pilot data;
   generating dynamic characteristic data to be communicated via the plurality of carriers; and
   modulating the plurality of carriers with the dynamic characteristic data, wherein a power level of the plurality of carriers as modulated is less than a maximum level of noise filtered by a device receiving the orthogonal frequency-division multiplexing signal.

2. The method of claim 1, wherein the plurality of carriers comprises frequency guard band carriers specified as unused by a telecommunication protocol.

3. The method of claim 1, wherein the plurality of carriers comprises carriers in at least one frequency guard band identified as not carrying payload data by a standardization organization.

4. The method of claim 1, wherein the dynamic characteristic data comprises stochastic dynamic data for transmission via the plurality of carriers from the at least one frequency guard band.

5. The method of claim 4, wherein the stochastic dynamic data comprises data other than predefined data associated with the orthogonal frequency-division multiplexing signal.

6. The method of claim 1, wherein modulating the plurality of carriers with the dynamic characteristic data comprising modulating the plurality of carriers using at least one of quadrature amplitude modulation or quadrature phase-shift keying modulation.

7. The method of claim 1, wherein the dynamic characteristic data comprises a dynamic identifier of a first repeater transmitting the orthogonal frequency-division multiplexing signal and further comprising determining a channel transfer function between a first antenna of the first repeater and a second antenna of a second repeater.

8. The method of claim 1, further comprising:
   transmitting, via a first antenna of the repeater, the orthogonal frequency-division multiplexing signal;
   receiving, via a second antenna of the repeater, the orthogonal frequency-division multiplexing signal; and determining a channel transfer function between the first antenna and the second antenna using the dynamic characteristic data.

9. The method of claim 8, wherein the dynamic characteristic data is not transmitted with each orthogonal frequency-division multiplexing signal communicated by the repeater.

10. The method of claim 8, further comprising:
    determining a phase margin and a gain margin between the first antenna and the second antenna using the channel transfer function; and
    modifying the phase margin and the gain margin at runtime by modifying gain and channel filter coefficients of the repeater.

11. The method of claim 8, wherein the first antenna comprises a coverage antenna and the second antenna comprises a donor antenna.

12. The method of claim 8, wherein the first antenna comprises a donor antenna an uplink and the second antenna comprises a coverage antenna.

13. The method of claim 8, further comprising distinguishing, based on the dynamic characteristic data, the orthogonal frequency-division multiplexing signal transmitted by the first antenna from a time-division duplexing synchronization signal received by the second antenna, wherein the first antenna comprises a coverage antenna and the second antenna comprises a donor antenna.

14. The method of claim 1, further comprising synchronizing a clock of the repeater to a clock of a global positioning system.

15. The method of claim 14, further comprising synchronizing a clock of a unit of a distributed antenna system and the clock of the global positioning system.

16. The method of claim 15, wherein a time-division duplex function of at least one of the repeater or the unit of the distributed antenna system uses a clock synchronized to an atomic clock of the global positioning system.

* * * * *